March 9, 1943.  L. W. BROOKS  2,313,514
LOADING, HAULING, AND DUMPING APPARATUS
Filed April 10, 1940  4 Sheets-Sheet 1
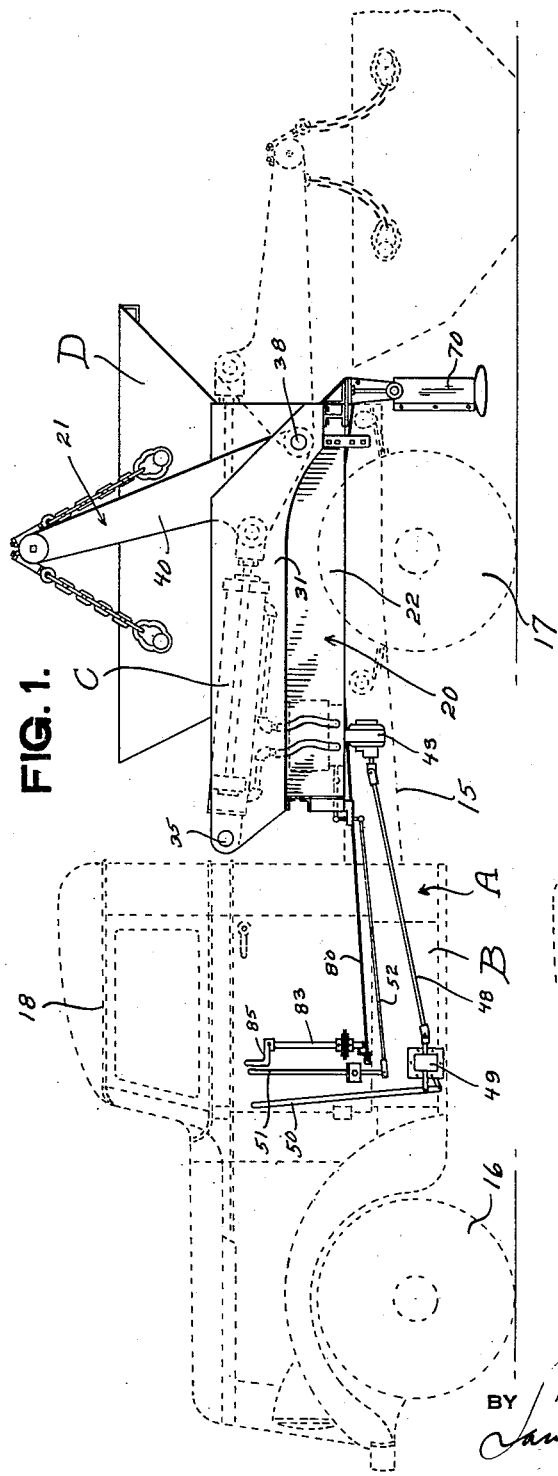
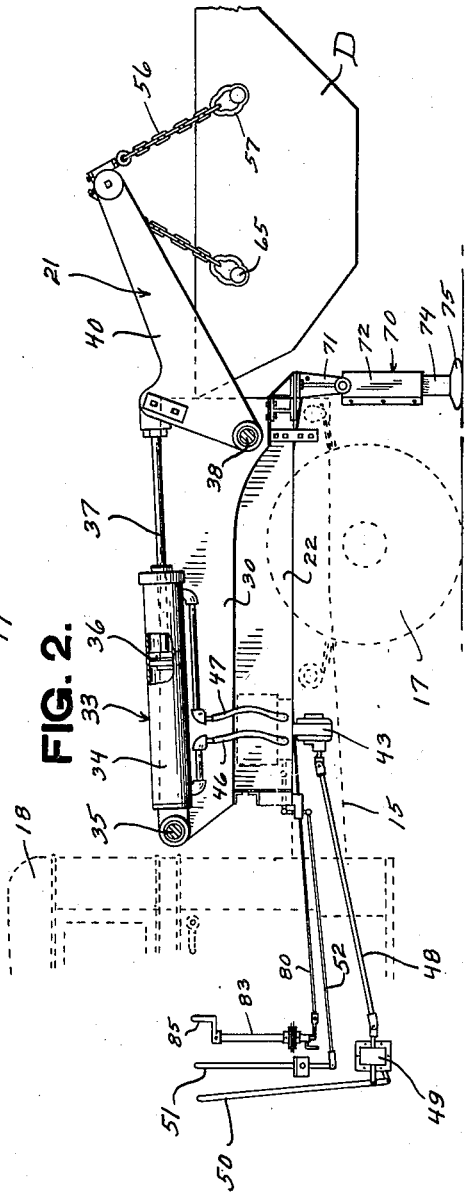
INVENTOR.
Lew Wallace Brooks.
BY
ATTORNEYS.

March 9, 1943.  L. W. BROOKS  2,313,514
LOADING, HAULING, AND DUMPING APPARATUS
Filed April 10, 1940  4 Sheets-Sheet 2

INVENTOR.
Lew Wallace Brooks.
BY Lancaster, Allwine Rommel
ATTORNEYS.

March 9, 1943. L. W. BROOKS 2,313,514
LOADING, HAULING, AND DUMPING APPARATUS
Filed April 10, 1940 4 Sheets-Sheet 3
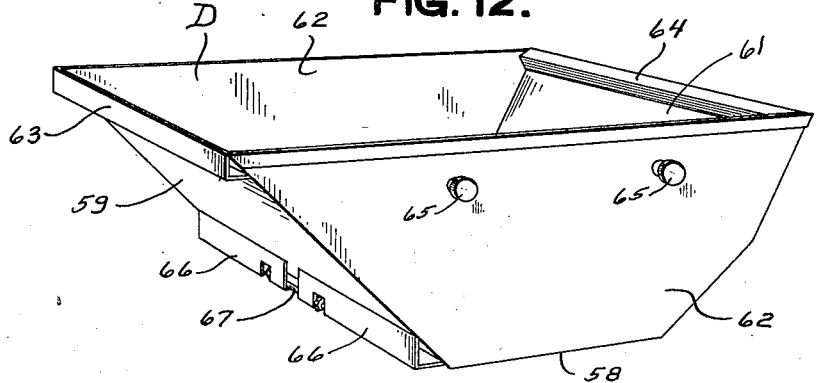
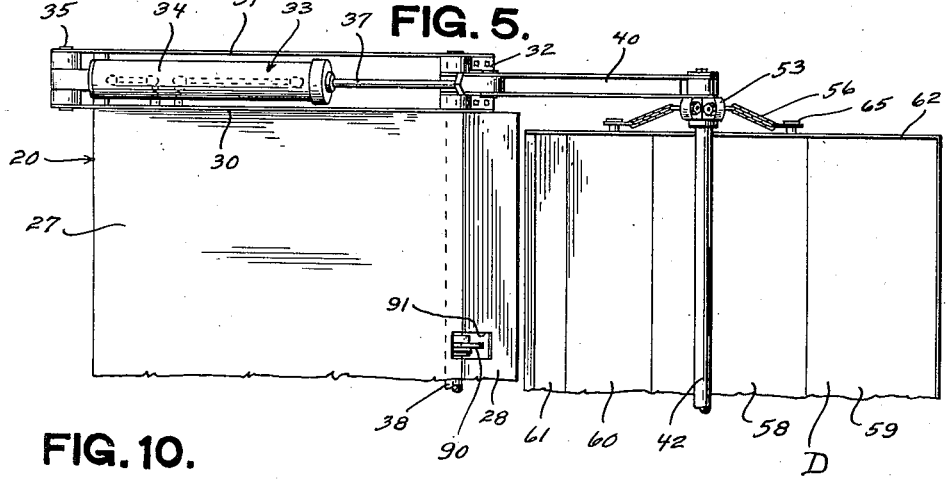
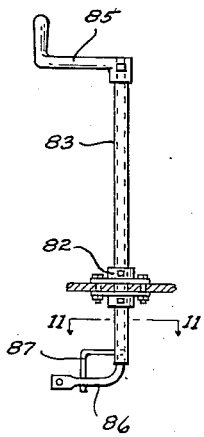
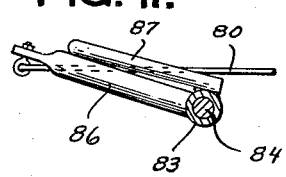
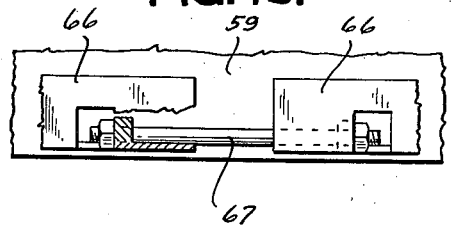
INVENTOR.
Lew Wallace Brooks.
BY
ATTORNEYS.

March 9, 1943.  L. W. BROOKS  2,313,514
LOADING, HAULING, AND DUMPING APPARATUS
Filed April 10, 1940    4 Sheets-Sheet 4
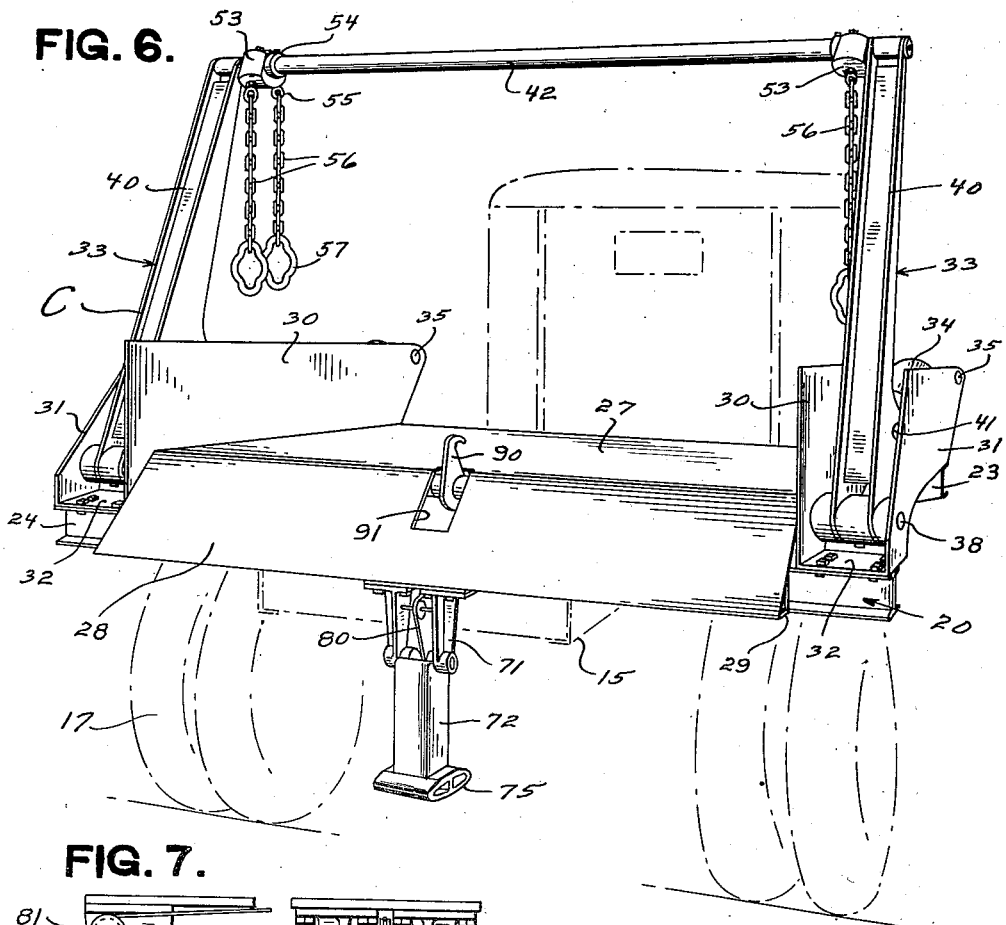
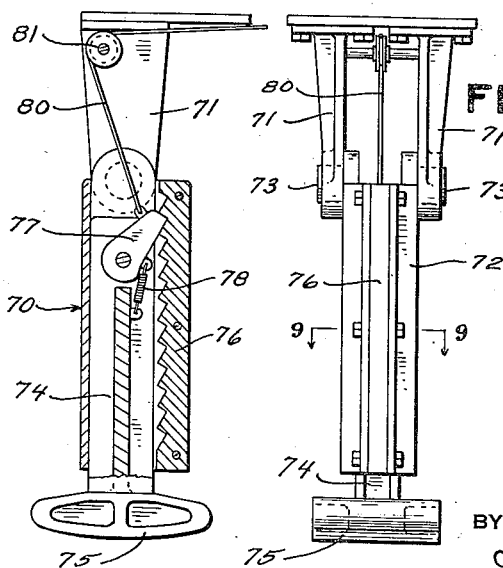
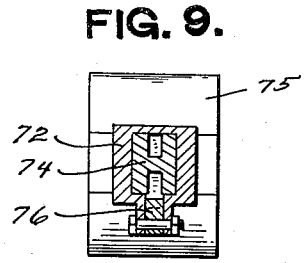
INVENTOR.
Lew Wallace Brooks.
BY
ATTORNEYS.

Patented Mar. 9, 1943

2,313,514

UNITED STATES PATENT OFFICE 2,313,514

LOADING, HAULING, AND DUMPING APPARATUS

Lew Wallace Brooks, Knoxville, Tenn.; E. N. Brooks, Karl Martin, and John A. Ayres, executors of said Lew Wallace Brooks, deceased, assignors to Brooks Equipment and Mfg. Co., Knoxville, Tenn., a corporation of Tennessee Application April 10, 1940, Serial No. 328,955

12 Claims. (Cl. 214—77)

The present invention relates to improvements in loading, hauling and dumping apparatus, and this application is a continuation in part of my co-pending application for patent for Loading, hauling, and dumping apparatus, filed May 19, 1938, Serial Number 208,935 now Patent No. 2,200,020, granted May 7, 1940.

A primary object of the present invention resides in the provision of improved material handling apparatus wherein a single vehicle provided with a hoist mechanism is adapted for economical loading, transporting, dumping, or unloading without dumping, loaded skips, buckets, or other apparatus loaded with miscellaneous materials.

A further object of this invention is the provision of improved hoist mechanism for handling skips, wherein maximum truck efficiency is provided thru proper load distribution and the skip when in carrying position on the truck is retained against shifting in any direction.

A further object is the provision of improved jack means for relieving the truck chassis from extreme overhung load when the skip or bucket is being raised from or lowered to the ground and which also eliminates the necessity for counterweight means upon the front portion of the truck.

A further object of the invention resides in the provision of an improved hoist mechanism for loading, hauling and dumping materials which is sturdy and quick acting and adapted for use in connection with an improved skip or bucket mechanism.

A further object resides in the provision of an improved loading, supporting, and dumping unit which may be readily installed upon a truck chassis and operated from the truck engine.

A still further object is the provision of improved means for controlling automatic dumping of the bucket by the driver of the truck.

A still further object of this invention is the provision of an improved skip or bucket construction for use in connection with the improved hoist mechanism of this invention.

Other objects and advantages of the invention will be apparent from the following detailed description, taken in connection with the accompanying drawings forming a part of this specification and in which drawings:

Figure 1 is a side elevation of the improved loading, hauling and dumping mechanism, showing the hoist structure on a truck chassis with the bucket in carrying position on the chassis, and showing in dotted lines the bucket in filling position on the ground with the boom chains attached ready to be raised into carrying position on the truck.

Figure 2 is a fragmentary view of the rear portion of the truck chassis and hoist structure with portions of the latter broken away, and showing the bucket in partially raised position with the jack leg in position relieving load strain on the truck chassis.

Figure 5 is a fragmentary top plan view of the unit showing the bucket in position ready to be picked up.

Figure 6 is a perspective view looking at the rear end of the bucket handling unit with the booms in raised position.

Figure 7 is an enlarged vertical section thru the support or jack leg assembly.

Figure 8 is a front elevation of the jack leg assembly.

Figure 9 is a horizontal section on line 9—9 of Figure 8.

Figure 10 is a detail view of the control means for the jack leg.

Figure 11 is an enlarged section on line 11—11 of Figure 10.

Figure 12 is a perspective view of the skip or bucket.

Figure 13 is a fragmentary detail view of the bottom portion of the bucket and showing the dumping bar which coacts with trip means on the bucket handling unit to tip the bucket for discharging the contents thereof.

Figure 3:
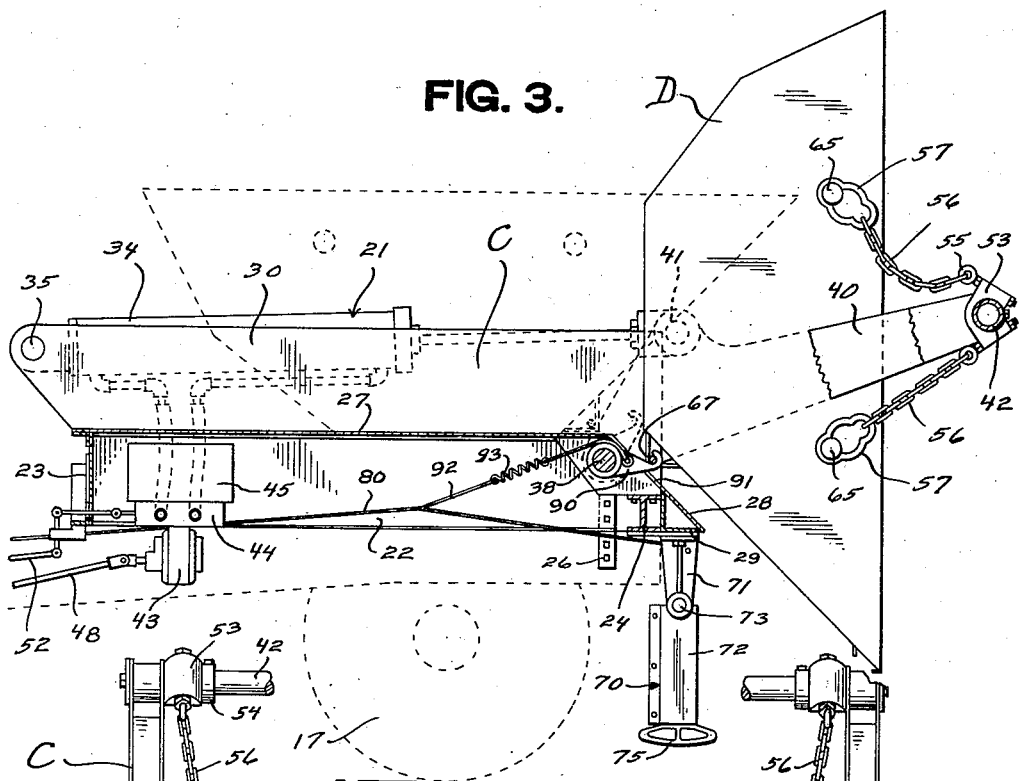
Figure 3 is a longitudinal section thru the loading, hauling and dumping unit with the bucket in a load dumping position.

Referring to the drawings in detail and wherein like reference characters designate corresponding parts thruout the several views, the letter A generally designates the improved loading, hauling and dumping apparatus consisting of a truck B, load or bucket handling unit C, and a bucket construction D.

The truck B may be of any preferred type and in the example shown includes the chassis 15 having front running gear 16 and rear running gear 17, with an engine forward of the cab structure 18 above the front running gear. The usual drive is provided between the engine and the rear running gear, and a suitable power take-off is associated with this drive for operating the mechanism C.

Figure 4:
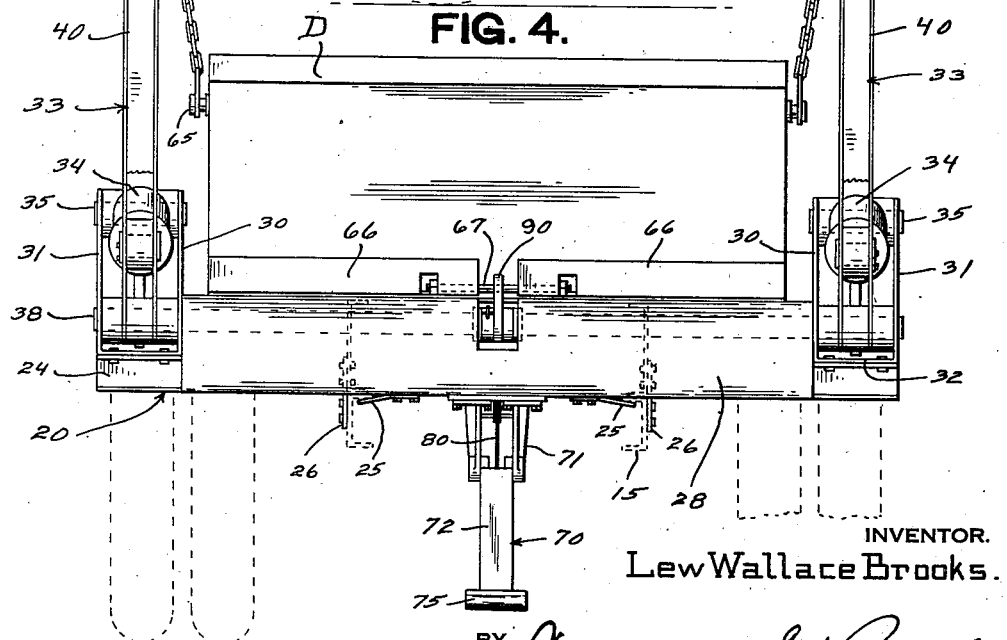
Figure 4 is an enlarged rear elevation of the unit with the bucket in loaded or carrying position.

Referring now to the load or bucket handling unit C, the same includes a sub-frame 20 upon which is mounted hydraulic hoist means 21 having detachable connection with the bucket D. The sub-frame 20 is mounted upon the truck chassis 15 rearwardly of the cab 18 with the rear end of the sub-frame substantially aligning with the rear end of the chassis. As shown particularly in Figure 4, the sub-frame is appreciably wider than the rear portion of the chassis frame of the truck.

The sub-frame 20 is preferably of welded construction and includes a pair of longitudinal support or bed rails 22 provided with suitable front cross bracing 23 extending laterally beyond the forward ends of the rails 22, and rear cross bracing 24 which extends laterally beyond the rear ends of the bed rails 22. The parallel bed rails 22 may be of channel-shape and spaced so as to rest upon the side rails of the truck chassis. Front and rear attaching plates 25 and 26 respectively, may be employed for securing the sub-frame 20 to the truck chassis. Supported upon and secured to the bed rails 22 is a horizontal deck plate or load supporting platform 27 having its side margins or edges disposed laterally of the bed rails 22 but spaced inward of the ends of the cross bracings 23 and 24. The forward edge of the deck plate may be secured as by welding or the like to the upper side of the front cross bracing 23. The rear end of the deck plate 27 has a sloping or inclined tilting portion 28 which extends downwardly over the rear cross bracing member 24 and is reinforced along its lower edge by an angle iron brace member 29.

Secured as by welding or any preferred manner to each side edge of the deck plate 27 is an inner side plate 30 which extends above the deck plate thruout its length, with the forward ends of the plates extending forwardly of the front edge of the deck plate. The rear end portions of these inner side plates 30 extend below the deck plate for attachment to the rear cross brace member 24 beyond the ends of the tilting portion 28. Disposed in parallel spaced relation outwardly of each inner side plate 30, is an outer side plate 31. These outer side plates 31 also extend forwardly of the front edge of the deck plate 27 and may be secured as by welding, to the outer ends of the front cross bracing 23. The rear end portions of these outer side plates 31 extend below the deck plate and are connected to their respective iner side plates by a spacer plate 32 which may be either bolted or welded to the ends of the rear cross brace 24. Thus, these parallel spaced apart side plates 30 and 31 form upwardly and rearwardly opening channelways extending longitudinally of the sub-frame at each side of the deck plate 27.

Referring now to the hydraulic hoist means 21, the same includes a pair of hoist units 33 arranged one in each of the channelways formed by the companion side plates 30 and 31. These hoist units 33 are of like construction and each includes a double acting hydraulic cylinder 34 which is pivoted at its forward end upon a horizontal pivot pin 35 mounted in the forward ends of the side plates 30 and 31. A piston 36 is arranged in the cylinder 34 and has connected thereto a piston rod 37 which extends from the rear end of the cylinder. Mounted at its lower end between the lower rear portions of the side plates 30 and 31, as upon a horizontal load shaft 38, is a boom 40 having pivotal connection above the shaft 38 with the rear end of the piston rod 37 as by a pin 41. This horizontal load shaft 38 is suitably journaled in the sub-frame 20 to extend transversely of the sub-frame beneath the rear end of the deck plate 27 and at a point slightly to the rear of the rear running gear 17. When the hoist units 30 are lowered, the free ends of the booms 40 extend rearward beyond the rear end of the truck chassis. Connecting the free ends of the booms 40 is a cross shaft or bar 42, which is preferably rigid with the booms so that the booms swing as a unit. As shown, the booms 40 have rearwardly offset portions adjacent their lower ends in which the piston rods 37 are pivoted by the pins 41.

Suitably mounted beneath the forward portion of the deck plate 27, between the bed rails 22, is a hydraulic motor including a pump 43 and a control valve 44. An oil reservoir 45 may be suitably associated with the hydraulic motor. Connecting the forward portion of each cylinder 34 with the control valve 44 is a fluid pressure line 46, while connecting the rear portion of each cylinder 34 with the control valve is a fluid pressure line 47; and these pressure lines are each provided with a section of hydraulic hose to permit vertical swinging of the cylinders during raising and lowering of the booms 40. A drive shaft 48 serves to operate the pump 43 from a suitable power take-off 49 driven from the truck engine and controlled by the control lever 50 disposed in the truck cab 18. The control valve 44 for controlling fluid delivery to the cylinders 34, is controlled by a valve control lever 51 which is also arranged in the truck cab 18 adjacent the driver's seat and has connection with the control valve by suitable linkage 52. The control valve 44 is of the type having several operative positions, such as controlling fluid circulation for hoisting or lowering the booms, or for arresting circulation to hold the booms in any desired position. As will be readily seen, when fluid is delivered into the rear of the cylinders 34 thru the pressure lines 47, the booms 40 will be elevated to hauling position, and when fluid is delivered into the forward end of the cylinders thru the pressure lines 46, the booms will be lowered.

Freely rotatable upon each end of the cross shaft 42 just inward of each boom 40 is a chain saddle 53 held against shifting inwardly along the cross shaft by collars 54. These chain saddles 53 are each provided with a pair of eye bolts 55 to which are attached one end of saddle chains 56. The lower or free ends of the pairs of saddle chains 56 are each provided with a key plate 57 for detachable connection with the bucket construction D.

Referring now to the bucket construction D, the same is made of heavy steel plate sections which are welded together and suitably reinforced to provide a substantially one-piece structure having a width slightly less than the spacing between the inner side walls 30 of the sub-frame and of not too great height to permit easy loading of the bucket. The bucket is substantially square in top plan and is formed with a flat bottom wall 58 having a long sloping or inclined rear wall 59 extending upwardly at an angle of about 45° from the rear edge of the bottom wall. The front wall of the bucket is formed with angularly related inclined wall portions 60 and 61 which are so disposed that the front wall extends in a more general vertical direction than does the flat rear wall 59. Vertical side walls 62 are welded to the ends of the wall portions 58, 59, 60 and 61. A reinforcing angle 63 is placed along the top edge and at the outer side of the rear wall 59, while a reinforcing angle 64 is placed at the inner side along the upper edge of the front wall portion 61. As shown more clearly in Figure 5, the area of the flat bottom wall 58 is rather small in comparison with the top area of the bucket. The specific formation of the front and rear walls of the bucket will place the major weight of the load to the front of the bucket. Welded to the upper portion of each side wall 62 are two spaced apart lugs 65 which are adapted to detachably receive the key plates 57 whereby the bucket may be suspended by the saddle chains 56 for handling the bucket.

Provided along the outer side at the lower end of the inclined rear wall 59 are reinforcing angle irons 66 which are spaced apart at their adjacent inner ends and support a dumping bar or rod 67 in spaced relation to the bucket wall 59 midway between the side walls 62. This dumping bar 67 is adapted to cooperate with trip means on the sub-frame for tilting the bucket into a load dumping position.

Referring now to the means for relieving load strain on the truck chassis during loading of the bucket, and eliminating the necessity of counterweight means upon the front portion of the truck, this means includes a jack leg structure 70 mounted beneath the rear cross bracing of the sub-frame rearward of the rear running gear of the truck and controlled from the truck cab 18. This jack leg structure 70 comprises a pair of brackets 71 secured to and depending from the rear cross bracing 24—29. A housing 72 is pivoted at its upper end by trunnions 73 to the lower ends of the brackets 71 whereby the housing may swing in a direction forwardly and rearwardly of the truck. Slidably movable in the housing 72 is a support bar 74 which is provided at its lower end with a base or foot 75 having a rounded bottom surface arcuated in a direction in which the housing 72 rocks. Arranged in the forward side of the housing 72 is a ratchet bar 76 with which a pawl 77 pivoted in the upper portion of the support bar 74 co-acts for retaining the support bar extended. A coil spring 78 normally urges the pawl 77 into engagement with the ratchet bar 76.

Connected at one end to the pawl 77 is a control cable 80 for elevating the support bar 74, and this cable extends upward between the brackets 71 and is trained over a sheave 81 from which it extends forwardly beneath the sub-frame 20 to a location beneath the floor of the truck cab 18. Mounted vertically within the truck cab 18 as by means of suitable brackets 82, is a fixed tubular housing 83 in which is disposed a rotatable shaft 84 having a crank handle 85 fixed upon its upper end. The lower end of the shaft 84 extends below the housing and is bent at a right angle providing a crank arm 86 to which the forward end of the cable 80 is attached. An L-shaped stop 87 welded to the fixed housing 83 and extending forwardly of the housing serves to limit swinging movement of the crank arm 86 beyond a given position when the arm is swung to raise the support bar 74.

Referring now to the trip means for dumping the bucket, this means includes a trip hook 90 mounted to turn freely on the load shaft 38 at a location midway of the ends of the shaft. This trip hook 90 projects upwardly thru a slot or opening 91 provided in the upper portion of the inclined tilting portion 28 at the rear of the deck plate 27 and is adapted to be engaged by the dumping bar 67 to tilt the bucket to a dumping position. A cable 92 is attached at one end of the trip hook 90 and has its opposite or forward end connected to the jack operating cable 80 at a point forwardly of the load shaft 38. A coil spring 93 is interposed in the cable 92 which allows the bucket in dumping to turn the trip hook 90 about the load shaft 38 without placing a strain on the cables 80 or 92. The trip hook 90 is limited in its forward swinging movement thru engagement with the deck plate at the forward edge of the opening 91; and is normally free to swing rearward and downward when engaged by the dumping bar 67. When so engaged, the corner edge of the angle irons 66 on the bucket engages the inclined deck portion 28 and forms a fulcrum point during dumping.

In operation of the apparatus, a plurality of the buckets D may be employed and may be loaded at convenient points with material to be transported. With the loaded bucket resting on the ground, as shown by dotted lines in Figure 1, the truck is backed up and the booms 40 lowered so that the key plates 57 on the chains 56 may be engaged over the headed lugs 65 on opposite side walls of the bucket. The truck driver then rotates the jack control shaft 84 by means of the crank handle 85 and swings the crank arm 86 to a rearward position which slackens the cable 80 and allows the support bar 74 of the jack 70 to lower by its own weight within the housing 72 until the foot or base 75 engages the ground surface, as shown in Figure 2. When the cable 80 is thus slackened, the spring 78 engages the pawl 77 with the ratchet 76 and the jack leg forms a column supporting the rear end of the truck and acts as a fulcrum about which the load can be raised or lowered. This controlled supporting column behind the rear running gear of the truck tends to retain the front end of the truck from raising up from the ground and also decreases the load strain on the rear truck springs. The operator now sets the pump 43 in operation and actuates the control valve 44 by means of the control lever 51 for raising the booms 40 whereby the bucket will be raised to a loaded or carrying position resting directly upon the deck plate 27, as shown in Figure 1. When the loaded bucket is in a carrying position on the sub-frame 20, the dumping bar 67 on the bucket is disposed forwardly of the trip hook 90, as shown by the dotted line showing of the bucket in Figure 3.

When the loaded bucket has been deposited upon the sub-frame 20, this additional weight upon the truck keeps compressive stress on the jack leg assembly 70. In order to transfer this stress from the jack leg to the rear truck springs, the truck is moved forward whereupon the jack housing 72 pivots in the brackets 71 and the base of the jack bar 74 rolls on its rounded lower surface, thus relieving any supporting action by the jack leg. With the load thus removed from the jack leg, the crank arm 86 of the jack control shaft 84 is swung to a forward position and exerts a pull on the cable 80 which draws the pawl 77 out of engagement with the ratchet 76 and raises the jack bar 74 within the housing 72. The stop 87 as shown in Figures 10 and 11, acts to hold the control shaft 84 from turning completely thru 360° due to the tension of the cable 80 when the jack bar 74 is in a raised position.

When desiring to lower a loaded bucket from the truck without dumping, the jack leg is lowered to form a support for the rear end of the truck in the same manner as it is employed when raising a loaded bucket to carrying position on the truck. As will be noted, a single control means operates both the jack leg and the trip hook simultaneously, and when tension is relieved on the cable 80 to permit the jack bar 74 to lower, the trip hook 90 may swing rearward and downwardly by gravity to an inoperative position with respect to the dumping bar of the bucket.

Referring now to the manner of dumping a loaded bucket from a carrying position on the truck, it is unnecessary to lower the jack leg when dumping a bucket owing to the fact that the dumping position of the bucket is but a short distance rearward of the rear running gear of the truck. When the jack leg is raised, the trip hook 90 is in an operative position, as shown in dotted lines in Figure 3, so as to be readily engaged by the dumping bar 67. As the booms 40 swing rearward, the dumping bar 67 engages the trip hook 90 which causes the bucket to be tipped into the full line showing position in Figure 3, so that the contents of the bucket are discharged. The hoist means may then be operated for returning the bucket to a carrying position on the truck and the dumping bar will automatically disengage from the trip hook.

The single control arrangement for both the jack leg and the trip hook are such as to insure against the operator setting down a loaded bucket without employing the jack leg to relieve load strain on the rear of the truck, but allows for the bucket being dumped without lowering the jack leg. As will be seen, when the jack leg is raised, the trip hook is in position to be engaged by the dumping bar, and when the jack leg is lowered, the trip hook will be out of position to be engaged by the dumping bar.

As shown particularly in Figure 6, the deck plate 27 provides a clear flat platform which is available for hauling miscellaneous materials when buckets are not being used.

Changes in detail may be made to the form of the invention herein shown and described, without departing from the spirit of the invention or the scope of the following claims.

I claim:

1. In apparatus for the loading, hauling, and dumping of materials, the combination of a truck, a bucket, hoist means on the truck for elevating and lowering the bucket, means for connection between the hoist means and the bucket for elevating the bucket to a supported position resting directly on the truck, and a dumping bar on the bottom of the bucket co-acting with a pivoted trip hook at the rear of the truck for automatically causing tilting of the bucket as the hoist means operates to lower the bucket from its supported position on the truck at a location where the materials are to be dumped.

2. In apparatus for loading, hauling, and dumping materials, a truck having a chassis including rear wheels, a bucket, a bucket handling unit on the chassis including a sub-frame extending rearward of the rear wheels, a hoist frame pivoted on the rear end of the sub-frame at the rear end of the chassis, hoist means pivoted on th front end of the sub-frame for elevating and lowering the hoist frame, and chain connections between the free end of the hoist frame and bucket for elevating the bucket by raising it upwardly at the rear end of the sub-frame and then forwardly and lowering it to a supported position resting directly on the sub-frame with the weight of the bucket substantially balanced forwardly and rearwardly of said rear wheels.

3. In bucket loading, hauling, and dumping apparatus, a bucket, and a handling unit for the bucket comprising a sub-frame, a boom pivoted upon the rear end of the frame, hydraulic hoist means for raising and lowering the boom, saddle chains on the boom for releasable connection with the bucket, a horizontal bucket supporting platform on the frame, a trip hook at the rear end of the platform, and means on the bucket engageable with the trip hook for tilting the bucket to a dumping position.

4. In a bucket, and bucket handling unit, a bucket having a dumping bar adjacent the bottom of its rear wall, a supporting platform for the bucket, a swinging trip hook normally projecting upwardly thru an opening at the rear end of the platform and engageable by the dumping bar for causing tilting of the bucket to a dumping position, and means for releasing the trip hook and permitting the trip hook to swing to a position out of engagement by the dumping bar to permit handling of the bucket without dumping.

5. In a loading, hauling, and dumping unit for trucks, a sub-frame for mounting upon the chassis of the truck, a flat deck plate extending beyond the sides of the sub-frame, a load shaft journaled transversely beneath the rear end of the sub-frame, a hoist unit at each side of the deck plate each including a boom mounted on the load shaft and pivoted therewith, and a load supporting cross shaft connecting the free ends of the booms, and load engaging means carried by each end of the cross shaft.

6. In apparatus for loading, hauling, and dumping materials, a truck having a chassis, a sub-frame on the chassis including a deck plate, a hoist unit at each side of the deck plate each including a boom, a cross shaft connecting the free ends of the booms, a bucket having a dumping bar, connections between the bucket and cross shaft whereby the bucket is elevated by the hoist units to a carrying position on the deck plate, a trip hook pivoted at the rear of the deck plate and engageable with the dumping bar for tilting the bucket to a dumping position, and control means for the hook permitting lowering of the bucket without dumping.

7. In apparatus for loading, hauling and dumping materials, a truck having a chassis, a sub-frame on the chassis including a deck plate, a hoist unit at each side of the deck plate each including a boom pivoted to swing rearward of the rear end of the truck chassis, a cross shaft connecting the free ends of the booms, a bucket, means connecting the bucket to the cross shaft, trip means for dumping the bucket, a jack leg at the rear end of the truck chassis, and a single control means for the trip means and jack leg and retaining the trip means in position to dump the bucket until the control means is operated to render the jack leg active to support the rear end of the chassis.

8. In loading, hauling, and dumping apparatus, a truck having a chassis, load handling means including a boom structure pivoted at the rear end of the chassis, an extensible jack leg pivoted at the rear end of the chassis to swing longitudinally of the chassis, and control means normally holding the jack leg contracted and operable to allow extension of the jack to a position engaging the ground for relieving load strain on the chassis during load lifting and lowering movement of the boom structure.

9. In a load handling unit for trucks, a sub-frame having a horizontal deck plate, a boom pivoted to swing rearward of the frame at each side of the deck plate, hoist means for the booms, a cross bar connecting the free ends of the booms, a bucket having headed lugs on each side wall thereof, a saddle rotatable on each end of the cross bar, and a pair of support chains suspended from each saddle and each having a key plate at its end for engaging over said lugs.

10. In loading, hauling, and dumping apparatus, a truck, a bucket having a dumping bar, a handling unit on the truck having a deck plate forming a support for the bucket, hoist means for the bucket, a pivoted trip hook for dumping the bucket, a jack leg at the rear end of the truck, a control cable for the jack leg, a trip hook cable connected between the control cable and trip hook and having a spring connected therein, and a control crank for the control cable.

11. Apparatus for lifting, transporting, dumping and lowering materials comprising a truck, a bucket provided with a dumping bar at its lower portion, and a bucket handling unit on the truck including a horizontal bucket supporting platform, hoist means for swinging the bucket from a position resting upon said platform to a position rearwardly of the truck and vice versa, a pivoted trip hook movable to a first position extending above the plane of said platform and into the path in which said dumping bar moves for engagement therewith as the bucket swings rearwardly responsive to said hoist means to bodily swing the bucket to a dumping position and said trip hook movable to a second position below the plane of said platform during a portion of the rearward swinging movement of the bucket, and control means for positioning said trip hook in either said first or second positions, including a spring yieldable to permit movement of said trip hook from said first position to said second position when the trip hook is in engagement with the dumping bar and during a portion of the rearward swinging movement of the bucket.

12. Apparatus for lifting, transporting, dumping and lowering materials comprising a truck, a bucket provided with a dumping bar at its lower portion, and a bucket handling unit on the truck including a horizontal bucket supporting platform, hoist means for swinging the bucket from a position resting upon said platform to a position rearwardly of the truck and vice versa, a pivoted trip hook movable to a first position extending above the plane of said platform and into the path in which said dumping bar moves for engagement therewith as the bucket swings rearwardly responsive to said hoist means to bodily swing the bucket to a dumping position and said trip hook movable to a second position out of the path of said dumping bar, and control means for positioning said trip hook in either said first or second positions and including a spring yieldable to permit movement of said trip hook from said first position to said second position when the trip hook is in engagement with the dumping bar and during a portion of the rearward swinging movement of the bucket.

LEW WALLACE BROOKS.